United States Patent [19]

Mosse et al.

[11] 4,294,037

[45] Oct. 13, 1981

[54] PRODUCTION OF MYCORRHIZAL FUNGI

[75] Inventors: Barbara Mosse, Harpenden, England; John P. Thompson, Toowoomba, Australia

[73] Assignee: National Research Development Corporation, England

[21] Appl. No.: 121,171

[22] Filed: Feb. 13, 1980

[51] Int. Cl.³ .............................................. A01G 31/00
[52] U.S. Cl. ........................................ 47/59; 435/254
[58] Field of Search ...................... 435/254; 47/59–65, 47/58

[56] References Cited

U.S. PATENT DOCUMENTS 3,704,546 12/1972 Hardy et al. ............................ 47/58

OTHER PUBLICATIONS

Daft & Nicolson, New Phytology, 1966, 65, 343.
Daft & Hacksaylo, Forest Science, 1977, 23, 207.
Mosse, Journal of General Microbiology, 1962, 27, 509.
Mosse & Phillips, Journal of General Microbiology, 1975, 5, 215.
Cooper, Horticulture Industry, 1976, 26.
Cooper, Groever, 1975.
Menge, Lembright and Johnson, Proceedings of the International Society of Citriculture, 1977, 1, 129.
Rothamsted Annual Report, 1978, 235. (published in 1979).

Primary Examiner—Robert E. Bagwill
Attorney, Agent, or Firm—Jacobs & Jacobs

[57] ABSTRACT

A process for the production of vesicular-arbuscular (VA) mycorrhizal fungi comprises growing a VA mycorrhizal fungus on plant roots in nutrient film culture. The resulting mycorrhizal fungus infected plant roots are of value in producing a mycorrhizal inoculum, especially for incorporation into a plant growth medium to enhance the uptake of nutrient by plants grown therein.

23 Claims, 1 Drawing Figure

U.S. Patent        Oct. 13, 1981        4,294,037
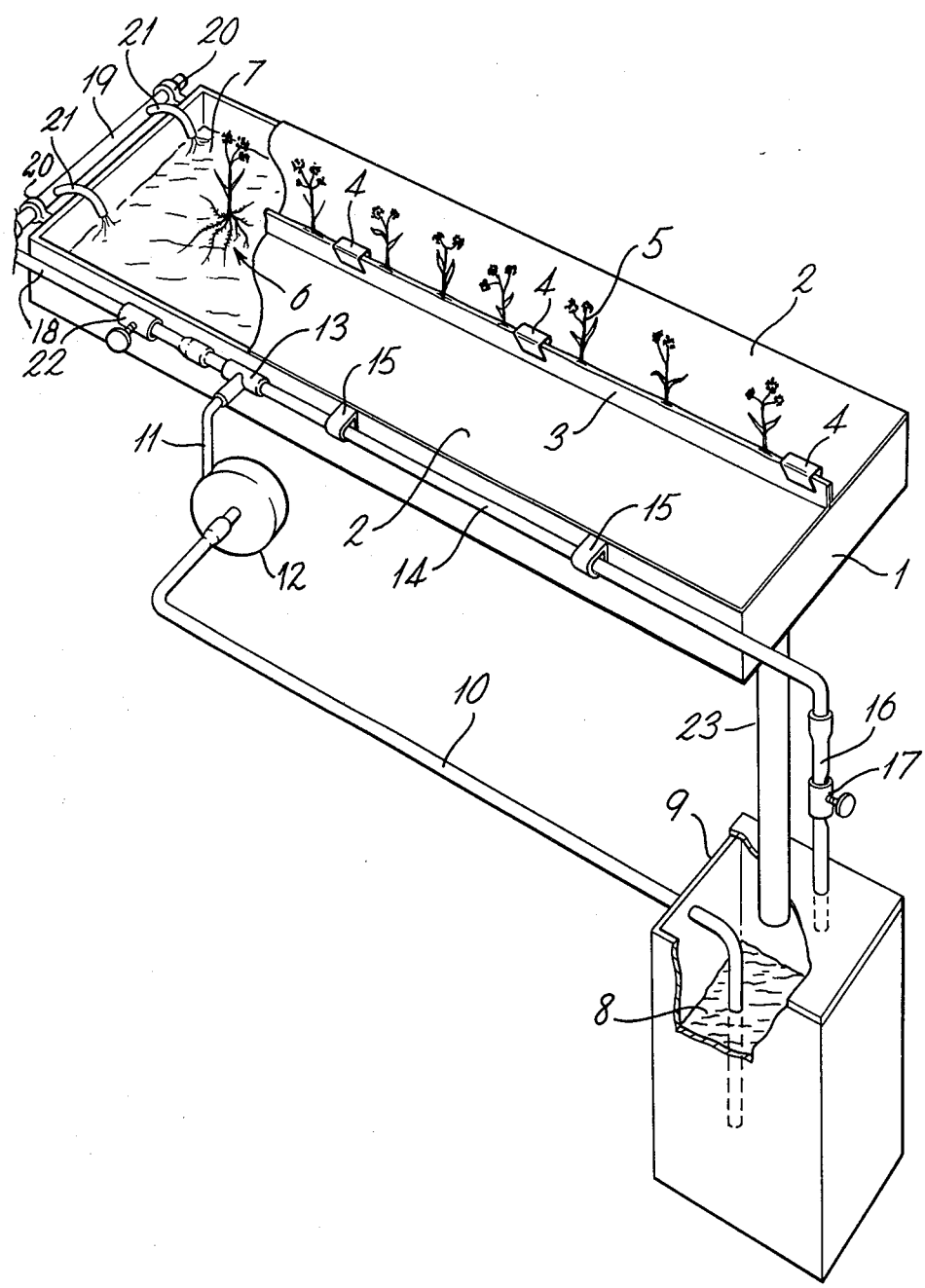

PRODUCTION OF MYCORRHIZAL FUNGI

This invention relates to the production of mycorrhizal roots and their use in soil or plant inoculation.

Certain fungi in mycorrhizal association with plant roots can enhance plant nutrient uptake, particularly of phosphorus.

Despite the great potential of vesicular-arbuscular (VA) mycorrhizal fungi for this purpose, however, the practical exploitation of these fungi has been restricted since they cannot at the present be grown without a plant host and this has so far prevented the production of sufficient inoculum for these fungi to be used in fertiliser conservation.

It is an object of the present invention, therefore, to provide a novel method suitable for the large scale production of VA mycorrhizal roots.

Accordingly the present invention comprises the growth of vesicular-arbuscular (VA) mycorrhizal fungi on plant roots in nutrient film culture.

Nutrient film culture is a specialised technique developed for the commercial production of crops such as tomatoes, lettuces and cucumbers. It entails the continuous re-cycling of a large volume of nutrient liquid in a film which flows over the roots of plants. This technique has been successfully adapted for the culture of mycorrhizal roots. That this has been possible is, indeed, surprising because both plant and fungus growth have to be balanced and they have different optimum requirements. Moreover, in nature, the fungi are very sensitive to waterlogging and submerged conditions.

The present invention is widely applicable among mycorrhizal systems. Among the very wide variety of plants susceptible to mycorrhizal infection, including Gymnosperms and particularly Angiosperms, preferred hosts are those which are capable of forming large quantities of mycorrhizal roots with the host plant well adapted to nutrient film culture. One particular class of plants of great interest is the legumes in view of their ability to fix atmospheric nitrogen in their nodules (inhabited by bacteria) which obviates the necessity for the addition of nitrogen in the culture solution and thereby avoids the possible inhibition of mycorrhizal development by excess inorganic nitrogen. Examples of legumes are clover, lucerne and particularly beans. In some instances, however, the presence of the legume bacteria in the inoculum may be a disadvantage and a non-legume may be preferred. Such non-legumes include cereals and particularly maize. A possible additional advantage is provided by the use of a host plant which will also produce crop for harvesting and in this respect vegetables for human consumption are of particular interest, for example beans and capsicums, but also particularly those crops which are currently grown commercially in nutrient film culture, for example cucumbers and particularly tomatoes and lettuces. An alternative possibility is plants which produce flowers such as carnations, chrysanthemums and freesias.

VA mycorrhizal fungi (endophytes) which can be used include particularly species of the genera Gomus, Gigaspora and Acaulospora (according to the classification of Gerdemann and Trappe in The Endogonaceae in the Pacific Northwest Mycologia Memoir No. 5, 1974, page 76 and others such as Nicholson and Schenck, Mycologia, 1970, 71, 178) but also species of Rhizophagus, Sclerocystis, etc. Specific examples are *Glomus caledonius, Glomus clarus, Glomus fasciculatus* and *Glomus mosseae, Gigaspora gigantia, Gigaspora gilmorei, Gigaspora heterogama* and *Gigaspora margarita, Acaulospora leavis, Sclerocystis sinuosa,* and *Rhizophagus tenuis* (sometimes alternatively classified as *Glomus tenuis*).

For good results, a low level of many of the nutrient elements (as opposed to trace elements) is usually required as compared with normal commercial application of nutrient film culture. However, it will be appreciated that the preferred values for the various nutrient elements will vary from one particular mycorrhizal system to another one depending particularly on the size and other features of the plant so that, for example, maize may require a higher level than beans whilst beans may require a higher level than lettuce. Indeed, even concentrations of the various nutrient elements and trace elements used in the normal commercial practice of nutrient film culture are varied somewhat according to the particular plants in question and various parameters of the nutrient film system employed. However, the following values in p.p.m. may be quoted as being reasonably representative: N, 110; Mg, 48; K, 200; Ca, 160; S, 200; P, 30; Fe, 3; B, 0.5; Mn, 0.5; Zn, 0.05; Cu, 0.02; Mo, 0.01; Co, 0.01. The concentrations suitable for use in the present invention will likewise depend as well upon parameters such as the number of plants in a container of a given length through which the nutrient medium flows and also the flow rate of the medium. Moreover, the more frequent is replenishment of the nutrients, the lower may be the initial concentration employed.

The following general guidance may, however, be given with regard to the concentrations of the various elements and trace elements initially, and conveniently throughout the culture, these comments being read in the light of the several provisos given hereinafter. Whilst mycorrhizal systems may be established in nutrient film culture using, particularly in the case of the nutrient elements, concentrations in a range of about one twentieth through one tenth to one quarter of those quoted above, it is possible to give more detailed guidance in respect of the various nutrients. Thus, preferred concentrations are: nitrogen from 0.5 or 1 to 10 or even about 11, for example 11.2, p.p.m., phosphorus from 0.1 or 0.05 p.p.m. or less, for example 0.01 p.p.m., to 2.5, 3 or 4 p.p.m., calcium from 8 or 10 to 100 p.p.m., and potassium from 10 to 20 or 49 p.p.m. the amounts of magnesium and sulphur are not of such primary significance in relation to the establishment of a mycorrhizal system but values of 2.4 to 12 p.p.m., for example about 5 p.p.m., for magnesium and of 10 to 50 p.p.m., but especially of 20 p.p.m. or less, for sulphur may conveniently be used. The concentration of iron, particularly, may vary quite widely dependent upon the particular plant system and whether the level is to be supplemented regularly so that values in a range from about 0.15 or 0.3 up to as much as 6 or 12 p.p.m. may be used, with the higher values being applicable, for example, in the case of maize. The concentration of the nutrient trace elements, boron, manganese, zinc, copper, molybdenum, and cobalt, is not of such primary significance as that of the nutrient elements, and it is generally suitable to use for each trace element a concentration of from about one tenth of the "normal" figure quoted above up to that figure, with the proviso that the figure for manganese is conveniently lower in proportion to the other trace elements than indicated above, being similar to the figure for zinc rather than that for boron.

It will be appreciated that the above figures are intended by way of guidance towards the obtaining of the best results and that adequate mycorrhizal systems can still be established with concentrations varying from the ranges quoted.

In the case of nitrogen it is possible to reduce or dispense with the requirement for this element in the nutrient by supplying it symbiotically through the use of a plant having the ability to fix nitrogen or by complementing the nitrogen supply through foliar feeding. The trace element, molybdenum, is required only for legumes and may be omitted in other cases.

The various nutrient elements may conveniently be incorporated to the desired extent by the addition to water of the salts of the elements conventionally used in liquid culture, as illustrated in the Examples. By using deionized water, the introduction of extra amounts of the various elements and trace elements thereby can be avoided. It will be appreciated that the introduction of the various elements is to some extent inter-related by virtue of the nature of the salts used, so that the use of calcium sulphate, for example, provides an amount of sulphur dictated by the amount of calcium required. The nature of the salts used is also selected in relation to the particular mycorrhizal system so that, for example, with maize it is preferred to use a preponderance of nitrate nitrogen, such as 95% nitrate N+5% ammonium N, whilst with lettuce the reverse is true.

Having commenced nutrient film culture using a medium as described above, it will be appreciated that the levels of the various elements will generally tend to fall as these are taken up by the plants. Among the seven elements listed above (as opposed to trace elements), control of the levels of nitrogen, phosphorus, calcium and potassium is the most important. Indeed, it has been found that if the levels of these four elements are supplemented, then, particularly with a relatively large volume of nutrient solution per plant, it may be possible in many cases without deviating substantially from the concentration ranges given above to avoid the need to supplement the levels of the other elements by merely replacing the whole partially spent medium with fresh medium after a certain period, for example at a frequency from two weeks to one month. In other cases, the supplementing of certain other elements may be required, for example of iron in the case of maize. It is of course generally the case that, the lower the concentration of an element in the ranges indicated, the more frequently is a supplement required.

It will be appreciated that a salt such as potassium nitrate may be used to supplement both potassium and nitrogen, whilst nitrogen may also be supplemented by foliar feeding as mentioned above. Moreover, in many instances the level of potassium may be conveniently supplemented in conjunction with the maintenance of pH. Thus, the various fungi generally have an optimum pH of the nutrient medium for vigorous mycorrhizal growth, for example a pH in the range of 6.0 to 6.8 and particularly 6.3 for the $E_3$ strain of *Glomus fasciculatus*, a pH in the range 7.0 to 7.5, and particularly 7.0, for the YV strain of *Glomus mosseae*, and one of about 5 for many types of Acaulospora. When the nutrient solution is made up in de-ionized water, the pH of a nitrogen-free medium will generally fall primarily due to the uptake of $K^+$ ions by the plants. If nitrogen is supplied as $NH_4^+$ ions then the pH will tend to fall even more rapidly, although supply as $NO_3^-$ ions will tend to cause an overall rise of pH. In the event of a drop in pH as culture proceeds, which may be detected by occasional measurement of the pH, the addition of aqueous potassium hydroxide solution in appropriate amounts provides a convenient method for both controlling the pH and supplementing the level of potassium in the culture medium.

A particularly convenient method of providing a continuing supply of nutrient element at a suitably low level involves the use of a sparingly soluble solid as a source of that element. Thus, although phosphorus may be provided and supplemented by the use of a soluble source thereof such as calcium dihydrogen phosphate, $Ca(H_2PO_4)_2$, it is more conveniently provided by the use of a source such as rock phosphate or bonemeal, the former being preferred in relation to plant growth and the latter in relation to mycorrhizal growth. Mixtures of the two, for example 50:50% w/w, are therefore of interest. Conveniently, when using such a sparingly soluble source, an amount which is sufficient to last until the liquid medium is replaced is placed in the container in which the plants are grown, or preferably, is placed in the storage tank from which the nutrient solution is cycled. By such means the phosphorus level in the medium is automatically maintained at a suitable low level.

Such devices as described above for the control of nutrient levels are, however, directed particularly to the use of relatively simple apparatus and, as an alternative, automatic monitoring of pH and, if desired, of any number of the nutrient concentrations may be employed, as may automatic adjustment of these parameters.

The flow rate of the liquid culture medium can be varied quite widely, rates of 200 ml to 2,000 ml/minute being suitable in many cases, although the optimum rate in any particular case will of course be related to the concentration level of the nutrients in the medium and the length of the container through which the nutrient is flowing and the number of plants present therein. The depth of the medium is likely to be more critical, a figure in the range of 1 mm to 1 cm and particularly from 1 mm to 5 mm more often being preferred.

It is of course necessary for the plants initially to be infected with the fungus and it is convenient for the nutrient film culture to be commenced with pre-infected seedlings (conveniently to a level of infection of about 5 to 10%) grown in soil or preferably in some medium such as a sand and grit mixture which encourages the formation of cleaner roots. One alternative procedure involves the use, for example with lettuce, of seedlings grown in blocks of some medium such as a peat or rockwool containing the inoculum. These blocks containing infected seedlings may then be transferred intact into the container in which the nutrient film culture is effected. A second alternative involves the use of small, for example 0.5 cm$^2$, sachets of capilliary matting containing inoculum among the plant roots, but the spread of infection achieved can be rather slow. In each case the inoculum used to produce infection may consist of spores, sporocarps or infected roots.

The roots of the nutrient film-grown plants are harvested for inoculum production when a satisfactory level of infection has been reached. Although high levels of infection of about 70 to 80% leading to high yields of mycorrhizal roots are obviously desirable, it has been found that the infectivity of the inoculum produced can be reduced by too long a period of cultivation, periods of about 1 to 3 months generally being suitable, and for this reason it can be advantageous to accept lower levels of infection than this at harvesting. Alternatives to the harvesting of each whole plant in the container may be considered. One possibility involves the harvesting of 50% of the plants at intervals of about 2 months, the harvested plants being replaced with new seedlings which need not be pre-infected but are subsequently infected by the remaining plants. Problems can, however, be encountered in disentangling the roots of adjacent plants and another possibility involves the removal at intervals of the roots along one side of a container housing perennial plants such as lucerne.

Following harvesting, the mycorrhizal roots are processed into a suitable form of inoculum for their intended use, for instance by simply cutting the roots into small pieces or by other suitable process. One method of facilitating the preparation of an inoculum in this way is to include in the container a material containing pores through which the mycorrhizal roots may grow thereby becoming dispersed through the material, one example of such a material being the capillary matting and another being the block of peat, rockwool etc., referred to above. The whole material may then be cut up to provide the inoculum.

In use, the inoculum, with is often dispersed in some carrier material, is applied to plants or particularly to soil or other medium in which plants are to be grown, in order to effect the development of a mycorrhizal root system in these plants. For application to plants directly mist culture techniques are of interest, whilst for the application to plants through the medium in which they are grown the use of an inoculum comprising a dispersion in a solid medium such as sand is often suitable.

There is a very wide range of applications for mycorrhizal inocula of which the following may be mentioned by way of example. Soils which have been fumigated or sterilized etc., for example by a compound such as Chloropicrate or a herbicide, or soils in which the topsoil has been mixed or overlaid with subsoil may be treated with inoculum to repopulate the soil with mycorrhiza. Crops requiring a transplantation stage such as coffee and tobacco and the establishment of perennials, for example ornamental trees and shrubs may be aided by the use of a mycorrhizal inoculum. Other specific areas which may be mentioned include the growth of legumes in pastures and the growth of ornamentals from cuttings, particularly in containers, as well as hydroponic plant culture.

The invention is illustrated by the following Examples.

EXAMPLES

Example 1

Growth of *Glomus fasciculatus*/Bean Mycorrhizal System

Eight bean seedlings (*Phaseolus vulgaris* cv. jamapa.) are infected with the $E_3$ strain of *Glomus fasciculatus* through growth in a sterilized sand and grit medium to which mycorrhizal inoculum derived from a soil grown mycorrhizal system has been added. The infected seedlings are transplanted when the level of infection is about 5%, typically at 2 to 3 weeks after emergence, into the nutrient film liquid culture apparatus shown in the accompanying FIGURE, which is diagrammatic in nature and not to scale. The FIGURE shows a perspective view with cut-away portions to reveal detail of the apparatus.

In the FIGURE, a shallow open-topped tray 1 of 1 meter length and 20 cm width is covered by two pieces of plastics material 2 folded back along one longitudinal side to form a lip 3 at right angles to the major part of the material. The lips 3 of each piece 2 are held together by clips 4 positioned at intervals leaving gaps through which the stems of the plants 5 emerge, the roots 6 lying in the liquid film 7 of culture medium. The bulk culture liquid medium or nutrient 8 is held in the container 9 from which it is pumped through the rubber tubes 10 and 11 by the pump 12 into the three way junction 13. From this junction the medium may flow (a) through the tube 14 of plastics material, attached to the tank 1 by clamps 15, and the rubber tube 16 back to the container 9, the flow rate being controlled by the screw clip 17, or (b) through the rubber tube 18 into the tube 19 of plastics material attached to the tank 1 by clamps 20 and thence through the two curved tubes 21, also of plastics material, into the tray 1, the flow rate being controlled by the screw clip 22. The culture medium flows through the tray 1 as the film 7 and leaves the opposite end of the tray through the tube 23 of plastics material located in the base of the tray and thence into the container 9.

Sixty liters of nutrient liquid culture medium are prepared by the addition of various aqueous stock solutions prepared in de-ionized water to a bulk volume of de-ionized water in the proportions indicated below:

| Stock Solution | | Amount of Stock Solution per 60 liters of final solution |
|---|---|---|
| 0.5M $K_2SO_4$ | | 30 ml |
| 1 M $MgSO_4 . 7H_2O$ | | 12 ml |
| 3.67% w/v FeNa EDTA | | 3 ml |
| Trace element solution containing in g/l: | | 6 ml |
| $H_2BO_3$ | 2.86 | |
| $MnCl_2 . 4H_2O$ | 0.18 | |
| $ZnSO_4 . 7H_2O$ | 0.22 | |
| $CuSO_4 . 5H_2O$ | 0.08 | |
| $Na_2MoO_4 . 2H_2O$ | 0.027 | |
| $CoSO_4 . 6H_2O$ | 0.053 | |
| Solid $CaSO_4 . 2H_2O$ (stirred into medium) | | 3.9 g |

This gives a culture medium consisting of an aqueous solution comprising the following nutrient concentrations in parts per million:

| Elements | | Trace Elements | |
|---|---|---|---|
| Mg | 4.8 | B | 0.056 |
| K | 19.5 | Mn | 0.005 |
| Ca | 15.0 | Zn | 0.005 |
| S | 20.4 | Cu | 0.002 |
| Fe | 0.3 | Mo | 0.001 |
| | | Co | 0.001 |

The pH of the culture medium is adjusted to 6.3 with 0.1 N aqueous KOH or 0.1 N aqueous $H_2SO_4$ depending on the initial pH of the nutrient solution, a sample of de-ionized water of pH 5.2 typically producing a medium with a pH in the range of 5.5 to 6.0 which requires raising slightly with KOH. Nitrogen is supplied by Rhizobium bacterial infection of the roots whilst phosphorus is supplied by the addition of 5 grams of bonemeal to the bulk nutrient container.

The apparatus is operated to produce a depth of film in the range of 1 to 5 mm with a flow rate of culture medium through the tank of 1,000 ml/minute. At intervals of 2 to 3 days sufficient 0.1 N aqueous potassium hydroxide is added to re-establish the pH at 6.3. After periods of four weeks and eight weeks the whole of the culture medium is replaced with fresh medium and the bonemeal is replenished as necessary. Beans are harvested from the growing plants as appropriate, and after a period of about three months the plants are removed for harvesting of the mycorrhizal roots. The cultivation process is then recommenced with fresh plants and fresh nutrient. A typical yield of fresh mycorrhizal roots is 20 to 30 grams per bean plant grown for 3 months, a typical level of infection being 55%.

In a variant of the procedure described above the use of a solid phosphorus source is replaced by the addition of 0.05 M aqueous $Ca(H_2PO_4)_2$ to the culture medium in a proportion of 60 ml/60 l of final culture medium solution, the phosphate level being replenished at intervals of 7 days by further additions of $Ca(H_2PO_4)_2$ solution.

Example 2

Growth of *Glomus mosseae*/Bean Mycorrhizal System

Bean seedlings (*Phaseolus vulgaris* cv. jamapa) infected with the YV strain of *Glomus mosseae* are grown in nutrient film culture using the culture medium, apparatus and procedure described in Example 1, but employing a pH for the nutrient medium of 7.0 rather than 6.3. A similar yield of mycorrhizal roots is obtained but with a typical level of infection of 32%.

Example 3

Growth of *Glomus clarus*/Bean Mycorrhizal System

Bean seedlings (*Phaseolus vulgaris* cv. jamapa) infected with *Glomus clarus* (Nicholson and Schenck, Mycologia, 1970, 71, 178) are grown in nutrient film culture using the culture medium, apparatus and procedure described in Example 1, and the same pH of 6.3 A similar yield of mycorrhizal roots is obtained but with a typical level of infection of 37%.

Example 4

Growth of *Acaulospora laevis*/Bean Mycorrhizal System

Bean seedlings (*Phaseolus vulgaris* cv. jamapa) infected with *Acaulospora laevis* are grown in nutrient film culture using the culture medium, apparatus and procedure described in Example 1, but with a pH for the nutrient medium of 5.5 rather than 6.3. A similar yield of mycorrhizal roots is obtained but with only a low level of infection, probably due to the special growth requirements of this particular fungus.

Example 5

Growth of *Glomus mosseae*/Maize Mycorrhizal System

Six maize seedlings (cv. fronica) are infected with the YV strain of *Glomus mosseae* through growth in a sterilized sand/grit mixture to which mycorrhizal inoculum has been added. The infected seedlings are transplanted and then cultured in the apparatus described in Example 1.

Sixty liters of nutrient liquid culture medium are prepared by the addition of various aqueous stock solutions prepared in de-ionized water to a bulk volume of de-ionized water in the proportions indicated below:

| Stock Solution | Amount of Stock Solution per 60 liters of final solution |
|---|---|
| 0.5 M $(NH_4)_2SO_4$ | 0.3 ml |
| 1 M $Ca(NO_3)_2$ | 2.25 ml |
| 0.5 M $K_2SO_4$ | 24 ml |
| 1 M $MgSO_4.7H_2O$ | 12 ml |
| 3.67% w/v FeNa EDTA | 60 ml |
| Trace element solution of Example 1 | 60 ml |
| Solid $CaSO_4.2H_2O$ (stirred into medium) | 3.47 g |

This gives a culture medium consisting of an aqueous solution comprising the following nutrient concentrations in parts per million:

| Elements | | Trace Elements | |
|---|---|---|---|
| $N(NH_4^+)$ | 0.07 | B | 0.56 |
| $N(NO_3^-)$ | 1.05 | Mn | 0.05 |
| Mg | 4.8 | Zn | 0.05 |
| K | 15.6 | Cu | 0.02 |
| Ca | 15.0 | Mo | 0.01 |
| S | 12.8 | Co | 0.01 |
| Fe | 6.0 | | |

The pH of the culture medium is adjusted to 7.0 with 0.1 N aqueous KOH or 0.1 N aqueous $H_2SO_4$ depending on the initial pH of the nutrient solution. Phosphorus is supplied by the addition of an excess of 5 grams of rock phosphate which is placed in the bulk nutrient container.

The apparatus is operated to produce a depth of film in the range of 1 to 5 mm with a flow rate of culture medium through the tank of 1,000 ml/minute. At intervals of 2 to 3 days the pH is re-adjusted to 7.0 with 0.1 N aq. $H_2SO_4$ in view of the pH rise. On alternate days the nitrogen level is returned to 1.1 p.p.m. by the addition of a 1 M aqueous solution of $KNO_3/Ca(NO_3)_2$ (2:1 w/w). At periods of four weeks the whole of the culture medium is replaced with fresh medium and the rock phosphate is replenished as necessary. Maize cobs are harvested from the growing plants if appropriate, and after a period of two/three months the plants are removed for harvesting of the mycorrhizal roots. The cultivation process is then recommenced with fresh plants and fresh nutrient. A typical yield of fresh mycorrhizal roots is 740 g for the whole tray after 3 months growth, a typical level of infection being 65%.

In a variant of this procedure, the amount of calcium sulphate dihydrate is increased to 18.89 g to give a calcium concentration of 75 p.p.m. and $KNO_3$ only is used to adjust the nitrogen level.

In a further variant of this procedure, quite a wide variation in the concentration of certain elements is found to be possible whilst still achieving the formation of a mycorrhizal system. The concentrations in p.p.m. used in this variation are $N(NH_4^+)$, 0.7; $N(NO_3^-)$, 10.5; Mg, 4.8; K, 15.6; Ca, 15.0; S, 12.8; Fe, 0.6 (supplemented on alternate days with 3.67% w/v FeNa EDTA); B, 0.056; Mn, 0.052; Zn, 0.005; Cu, 0.002; Mo 0.001; Co, 0.001.

Example 6

Growth of *Glomus mosseae*/Lucerne *Glomus mosseae*/Clover and *Glomus mosseae*/Lettuce and *Glomus mosseae*/Capiscum Lucerne (*Medicago sativa*), clover (*Trifolium repens*), lettuce (*Lettuca sativa*) and capsicum (*Capsicum annum*) seedlings are infected with the YV strain of *Glomus mosseae* through growth in a sterilized sand/grit mixture to which mycorrhizal inoculum has been added. The infected seedlings are transplanted and then cultured together in the apparatus described in Example 1, the apparatus containing seedlings of all three types.

Sixty liters of nutrient liquid culture medium are prepared by the addition of various aqueous stock solutions prepared in de-ionized water to a bulk volume of de-ionized water in the proportions indicated below:

| Stock Solution | Amount of Stock Solution per 60 liters of final solution |
| --- | --- |
| 0.5M (NH$_4$)$_2$ SO$_4$ | 3 ml |
| 0.5M K$_2$SO$_4$ | 24 ml |
| 1M MgSO$_4$.7H$_2$O | 12 ml |
| 3.67% w/v FeNa EDTA | 60 ml |
| Trace element solution of Example 1 | 60 ml |
| Solid Ca SO$_4$.2H$_2$O (stirred into medium) | 3.9 g |

This gives a culture medium consisting of an aqueous solution comprising the following nutrient concentrations in parts per million:

| Elements | | Trace Elements | |
| --- | --- | --- | --- |
| N(NH$_4$$^+$) | 0.7 | B | 0.56 |
| Mg | 4.8 | Mn | 0.05 |
| K | 15.6 | Zn | 0.05 |
| Ca | 15.0 | Cu | 0.02 |
| S | 17.3 | Mo | 0.01 |
| Fe | 6.0 | Co | 0.01 |

The pH of the culture medium is adjusted to 7.0 with 0.1 N aqueous KOH or 0.1 N aqueous H$_2$SO$_4$ depending on the initial pH of the nutrient solution. Phosphorus is supplied by the addition of 2.5 grams of rock phosphate which is added to the bulk nutrient container.

The apparatus is operated to produce a depth of film in the range of 1 to 5 mm with a flow rate of culture medium through the tank of 1,000 ml/minute. The pH is re-adjusted to 7.0 with 0.1 N aqueous KOH if it falls below 6.5. On alternate days the nitrogen level is returned to 0.7 p.p.m. by the addition of a 0.5 M aqueous solution of (NH$_4$)$_2$SO$_4$. After a period of four weeks the whole of the culture medium is replaced with fresh medium and the rock phosphate is replenished as necessary, whilst after a period of about one and a half months the plants of each type are removed for harvesting of the mycorrhizal roots. Mycorrhizal systems are established in each case.

In a variant of this procedure, lettuce seedlings are grown in nutrient film culture in rockwool blocks using a simplified form of apparatus in which the tray and cover is replaced by corrugated sheeting of a rigid plastics material covered by an opaque sheet of a flexible plastics material.

Example 7

Tests of Infectivity of Mycorrhizal Roots grown by Nutrient Film Culture

The mycorrhizal root systems *G. fasciculatus* (E$_3$)-/bean, *G. mosseae*/bean, *G. clarus*/bean and *G. mosseae*/maize were grown and harvested as described in the previous examples. An inoculum was prepared by removing the tops of the plants, cutting the mycorrhizal roots into 1 cm lengths and mixing these with dry sterilised sand. The inoculum was used in amounts of 0.2 g, 0.4 g or 2.0 g to infect lettuce, onion, bean, clover and maize seedlings by placing the inoculum into a cavity formed in a layer of soil and growing the seedlings from seed in a second layer of soil placed on top of the first.

It was found that growth of infected seedlings resulted in all instances but that the onset of infection was related to the amount of roots used as inoculum, so that the percentage infection 5 weeks after germination was in general greater with 2.0 g inoculum than with 0.4 g whilst infection was only just starting with 0.2 g. After 10 weeks from germination, however, the infection levels in all test seedlings were similar irrespective of the original weight of inoculum.

Comparisons with an inoculum produced from mycorrhizal root systems grown in soil showed no difference in the level of infection achieved as compared with the mycorrhizal roots grown by nutrient film culture.

In a variant of the above procedure the mycorrhizal roots were air dried before use but this was found to reduce their infectivity, test seedlings inoculated with 0.2 g, 0.04 g, and 0.02 g of air dried root being as heavily infected after 10 weeks as those inoculated with the corresponding weight of fresh root (2 g, 0.4 g and 0.2 g, respectively) were after only 5 weeks.

The mycorrhizal root systems produced by the procedures described in the Examples generally contain fungus which is present on the exterior of the roots and fungus which has infiltrated the interior of the root system. The use of the whole root system in the preparation of an inoculum, as described above, thus makes use of the whole amount of the fungus grown but, if desired, it is possible to use only the spores and/or sporocarps of the fungus present on the exterior of the roots in the preparation of an inoculum. Such an approach is most viable in the case of those fungi which show a high level of production of spores.

We claim:

1. A process for the production of vesicular-arbuscular (VA) mycorrhizal fungi by growing a VA mycorrhizal fungus on plant roots wherein the invention comprises effecting said growth in nutrient film culture.

2. A process according to claim 1, wherein the fungus is of one of the genera Glomus, Gigaspora and Acaulospora.

3. A process according to claim 2 wherein the fungus is of one of the species *Glomus mosseae, Glomus clarus* and *Glomus caledonius.*

4. A process according to claim 1, wherein the plant is a legume.

5. A process according to claim 4, wherein the plant is a species of clover, lucerne or bean.

6. A process according to claim 1, wherein the plant is a cereal.

7. A process according to claim 6, wherein the plant is maize.

8. A process according to claim 1, wherein the plant produces a crop for harvesting.

9. A process according to claim 8, wherein the plant is a species of cucumber, tomato or lettuce.

10. A process according to claim 1, wherein the concentration of nitrogen in the nutrient is from 0 to 11.2 p.p.m.

11. A process according to claim 10 wherein the concentration is from 0.5 to 10 p.p.m.

12. A process according to claim 1, wherein nitrogen is supplied through nitrogen fixation.

13. A process according to claim 1, wherein the concentration of phosphorus in the nutrient is from 0.01 to 4 p.p.m.

14. A process according to claim 13, wherein the concentration is from 0.1 to 3 p.p.m.

15. A process according to claim 1, wherein phosphorus is provided to the nutrient by a sparingly soluble solid source thereof.

16. A process according to claim 15, wherein the solid source is selected from the group consisting of bonemeal and rock phosphate.

17. A process according to claim 1, wherein the concentration of calcium in the nutrient is from 8 to 100 p.p.m.

18. A process according to claim 17, wherein the concentration is from 8 to 40 p.p.m.

19. A process according to claim 1, wherein the concentration of potassium in the nutrient is from 10 to 49 p.p.m.

20. A process according to claim 19, wherein the concentration is from 10 to 20 p.p.m.

21. A process according to claim 1, wherein the mycorrhizal roots are grown in proximity to a material which is porous thereto and in which the roots become distributed.

22. A process for producing a mycorrhizal inoculum which comprises treating mycorrhizal roots derived by growing a VA mycorrhizal fungus on plant roots in nutrient film culture to produce an inoculum therefrom.

23. A process of plant cultivation which comprises cultivating plants in a plant growth medium containing a mycorrhizal inoculum produced by the process of claim 22.

* * * * *

UNITED STATES PATENT AND TRADEMARK OFFICE
CERTIFICATE OF CORRECTION

PATENT NO. : 4,294,037
DATED : October 13, 1981
INVENTOR(S) : Barbara Mosse et al.

It is certified that error appears in the above-identified patent and that said Letters Patent are hereby corrected as shown below:

In the title page, insert --claims priority from British Application 7905246, filed in Great Britain on February 14, 1979.--.

In column 1, line 64, insert a comma(,) after "Northwest";
In column 5, line 38, change "Chloropicrate" to --Chloropicrin--;
In column 5, line 57, change "jamapa" to --Jamapa--;
In column 8, line 43, change "KNO3" to --$KNO_3$--;
In column 10, line 52, change "by" to --,which comprises--;
In column 10, lines 53-54 delete "wherein the invention comprises effecting said growth".

Signed and Sealed this

Twenty-third Day of February 1982

[SEAL]

Attest:

GERALD J. MOSSINGHOFF

Attesting Officer    Commissioner of Patents and Trademarks